(12) United States Patent
Haghighi et al.

(10) Patent No.: US 6,438,622 B1
(45) Date of Patent: Aug. 20, 2002

(54) MULTIPROCESSOR SYSTEM INCLUDING A DOCKING SYSTEM

(75) Inventors: Siamack Haghighi, Chandler, AZ (US); Neil W. Songer, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/193,269

(22) Filed: Nov. 17, 1998

(51) Int. Cl.[7] .............................................. G06F 13/00
(52) U.S. Cl. ............................................ 710/1; 710/129
(58) Field of Search ........................ 710/1, 129; 713/1, 713/2, 100

(56) References Cited

U.S. PATENT DOCUMENTS

| | | | |
|---|---|---|---|
| 5,282,272 A | | 1/1994 | Guy et al. |
| 5,530,932 A | | 6/1996 | Carmean et al. |
| 5,790,871 A | * | 8/1998 | Qureshi et al. ............. 395/733 |
| 5,991,833 A | * | 11/1999 | Wandler et al. ............... 710/52 |
| 6,021,452 A | * | 2/2000 | Birch et al. .................. 710/129 |
| 6,035,354 A | * | 3/2000 | Klein ......................... 710/101 |

FOREIGN PATENT DOCUMENTS

| | | | |
|---|---|---|---|
| JP | 08022414 A | * | 1/1996 |
| JP | 09097122 A | * | 4/1997 |

OTHER PUBLICATIONS

Intel MultiProcessor Specification Version 1.4, Aug. 1996.*
Girkar et al., "Illinois–Intel Multithreading Library: Multithreading Support For Intel Architecture Based Multiprocessor Sysems," Intel Technology Journal Q1 '98 (1998).
Intel Corporation, Multiprocssor Specification, Version 1.4 (May 1997).

* cited by examiner

Primary Examiner—Bipin Shalwala
Assistant Examiner—Nitin Patel
(74) Attorney, Agent, or Firm—Trop, Pruner & Hu, P.C.

(57) ABSTRACT

A system includes a docking base unit having a first processor and a portable computing device that is dockable to the docking base unit that includes a second processor. A module identifies the number of processors in the system once the portable computing device is docked to the docking base unit and configures the system as a multiprocessor system if more than one processor is identified.

27 Claims, 4 Drawing Sheets

MULTIPROCESSOR SYSTEM INCLUDING A DOCKING SYSTEM

BACKGROUND

The invention relates to a multiprocessor system including a docking system.

As portable computers have become increasingly powerful, many users are now using portable computers as replacements for desktop computer systems as they provide greater flexibility to the user. In the office or other location, portable computers may be docked to docking bases for access to additional capabilities and resources. Example devices that may be coupled to the docking base include a network, printers, mass storage devices such as hard disk drives, compact disc (CD) or digital video disc (DVD) drives, and other types of devices.

When a portable computer is docked to a docking base, computing power is typically provided by a central processing unit (CPU) in the portable computer. An example configuration of a portable computer may be one that includes a system bus, an expansion bus, and bridges to couple the buses to each other, to the CPU, and to peripheral or input/output (I/O) devices. An example configuration of a docking base may include a system bus or an expansion bus (or both) that couples to a bus in the portable computer when docked.

Although portable computers have rapidly become more powerful, they still lag the performance of the typical desktop system due to several constraints, including power consumption limitations (to extend battery life) and thermal dissipation limitations. For example, storage capacity and peripheral capability are limited as are the CPU's core voltage level and core clock frequency to conserve power and to reduce heat generation.

Thus, a need arises for a docking system that is able to provide increased computing capability.

SUMMARY

In general, according to one embodiment, a system includes a docking base and a computing device dockable to the docking base. The number of processors in the system once the computing device is docked to the docking base is identified. The system is configured as a multiprocessor system if more than one processor is identified.

Other features will become apparent from the following description and from the claims.

DETAILED DESCRIPTION

Embodiments of the invention include a system having a portable computing device and a docking base unit. The portable computing device may include general purpose or special purpose computers, portable electronic devices, appliances, and other controller-based systems in which the controller may include a microprocessor, microcontroller, application specific integrated circuit (ASIC) or a programmable gate array (PGA). For purposes of this application, embodiments are described with a portable computer; it is to be understood that any other computing device may be used in other embodiments of the invention.

When the portable computer is docked to the docking base unit, the system performs as a multiprocessor computer system. In such embodiments, each of the docking base unit and the portable computer includes at least one processor or central processing unit (CPU). A processor or CPU may include a microprocessor, a microcontroller, a programmable control circuit implemented with an ASIC or PGA, or any other special-purpose or general-purpose control device. Once the portable computer is docked to the docking base unit, the multiple processors in the system are configured to run in a multiprocessing environment. In one embodiment, a CPU in the portable computer may be designated as the master processor to perform initialization functions. After initialization, the remaining CPUs (including the one or more CPUs in the docking base unit and any additional CPUs in the portable computer) are enabled. A multiprocessor-compliant operating system (OS), such as Windows NT from Microsoft Corporation, runs on the multiple CPUs once the portable computer is docked to the docking base unit.

Figure 1A:
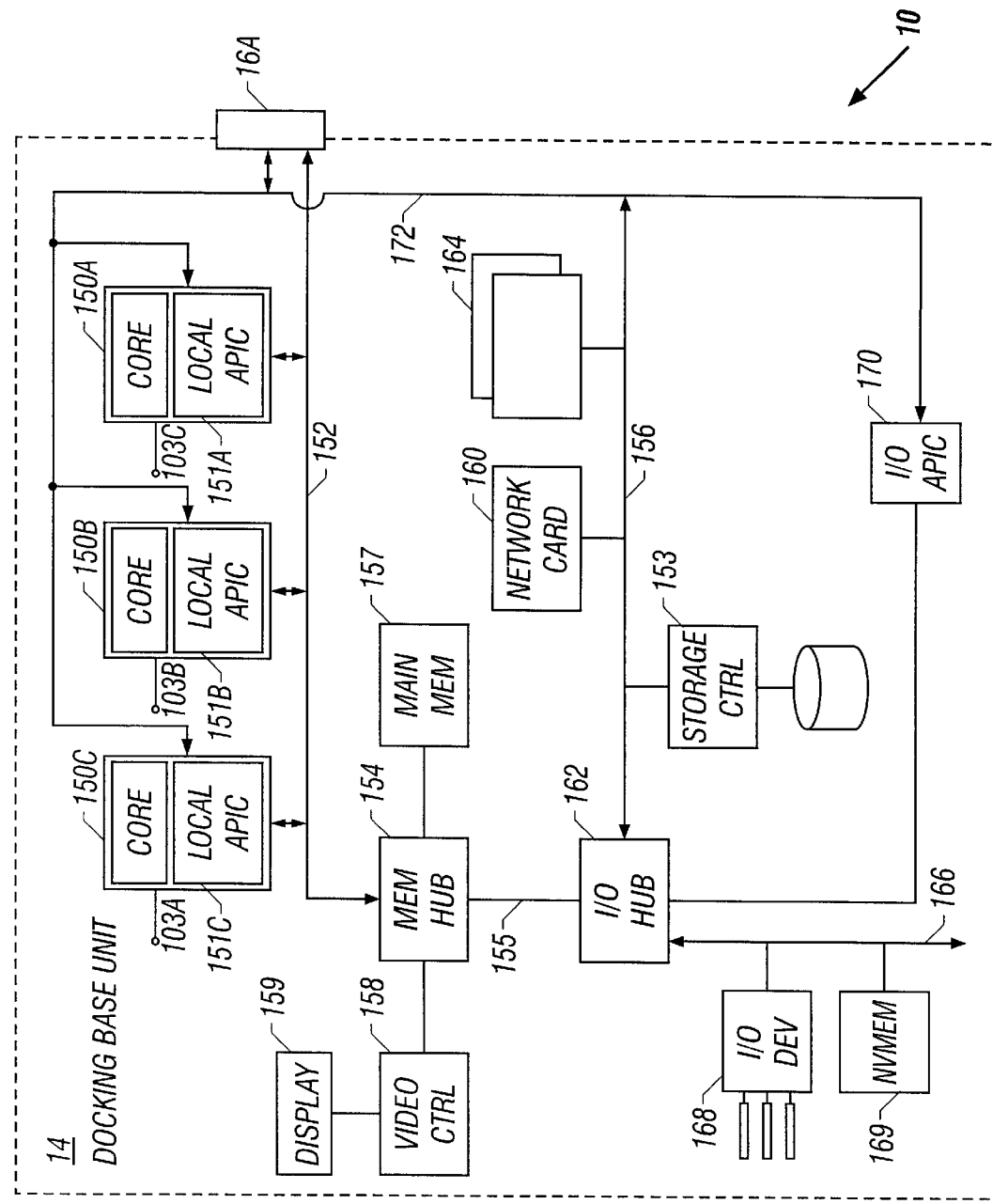
FIGS. 1A–1B is a block diagram of a portable computing device docked to a docking base unit according to an embodiment of the invention.
Figure 1B:
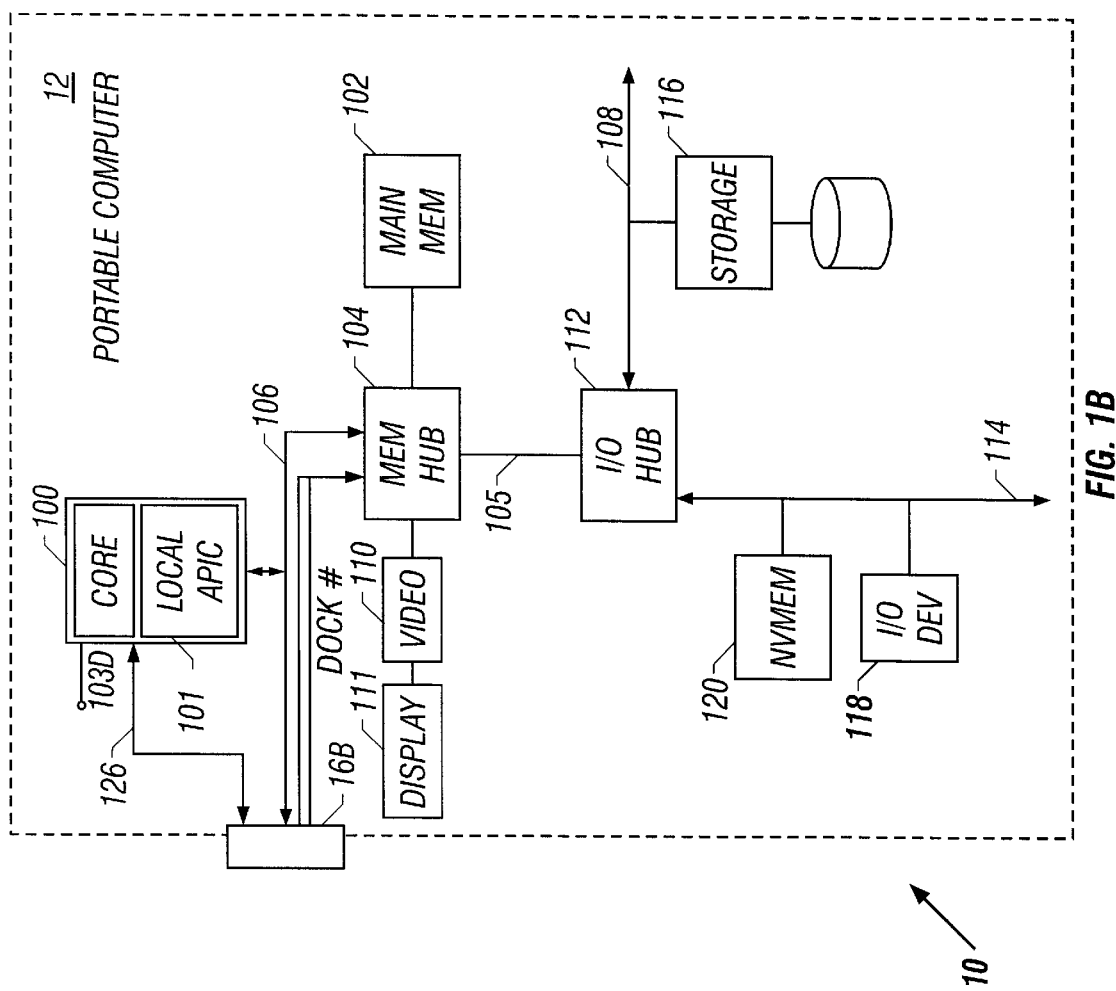

Referring to FIGS. 1A–1B, according to an embodiment of the invention, a system 10 includes a portable computer 12 or other computing device that is docked to a docking base unit 14 through docking connectors 16A–16B (hereinafter referred to collectively as "docking connector 16"). The portable computer 12 includes a CPU 100 that is coupled to a host bus (or front-side bus) 106. In some embodiments, the CPU 100 may include the Pentium® family of microprocessors from Intel Corporation, including the Pentium® II processors. Other types of processors, microcontrollers, or programmable control circuits may also be used.

Also coupled to the host bus 106 is a memory hub 104 that includes a memory controller coupled to system memory 102 and a graphics interface (such as an Accelerated Graphics Port or A.G.P. interface defined by the Accelerated Graphics Port Interface Specification, Revision 2.0, published May 1998) coupled to a graphics controller 110, which is in turn coupled to a display 111. The memory hub 104 is coupled to an input/output (I/O) hub 112 over a link 105. The I/O hub 112 includes a host bridge controller coupled to a system bus 108 (e.g., a Peripheral Component Interconnect or PCI bus as described in the PCI Local Bus Specification, Production Version, Rev. 2.1, published in June 1995). The system bus 108 is coupled to various peripheral devices, including a storage device controller 116 coupled to a mass storage device such as a hard disk drive, a compact disc (CD) or digital video disc (DVD) drive, or other device.

In the portable computer 12, a secondary bus 114 may be coupled to a system bridge controller in the I/O hub 112. I/O devices 118 (e.g., an I/O circuit) coupled to a floppy drive and serial and parallel ports) may be coupled to the secondary bus 114 as may a non-volatile memory 120 that stores basic input/output system (BIOS) routines to perform system startup.

In one embodiment, the docking base unit 14 contains similar components as the portable computer 12. In the docking base unit 14, one or more CPUs 150A–150C are coupled to a host or front-side bus 152. A memory hub 154 is coupled to the host bus 152 and includes a memory controller and a graphics interface (e.g., A.G.P. interface) coupled to system memory 157 and a graphics controller 158, respectively. The graphics controller 158 is coupled to a display 159. The memory hub 154 is coupled by a link 155 to an I/O hub 162 that includes a system bridge controller coupled to a system bus 156, which may also be a PCI bus. The system bus 156 may be coupled to a network card 160 that in turn may be coupled to a network (not shown). Slots 164 for coupling to additional peripheral devices may also be coupled to the bus 156. A storage device controller 153 coupled to the system bus 156 may control access to devices such as a hard disk drive or a CD or DVD drive. Other components in the docking base unit 14 include a secondary bus 166 that may be coupled to I/O devices 168 (which may include an I/O circuit coupled to a floppy drive and serial and parallel ports) and a non-volatile memory 169.

The system memory 157 and mass storage devices (e.g., hard disk drives) in the docking base unit 14 may be much larger in capacity than corresponding components in the portable computer 12, thus increasing the performance of the system once the portable computer 12 is docked to the docking base unit 14. Software and firmware layers and modules may be stored in storage media in either the portable computer 12 or the docking base unit 14, the storage media including system memory, hard disk drives, CD or DVD drives, non-volatile memory, and floppy drives.

In one embodiment, because both the portable computer 12 and docking base unit 14 basically include resources of complete computer systems, both may be independently operated as stand-alone systems if desired. Alternatively, many of the components of the docking base unit 14shown in FIGS.1A–1B may be removed, leaving only some core components such as the one or more CPUs 150, the memory hub 154, the I/O hub 162, the system bus 156, the video card 158 and video monitor 159, and the network card 160.

The system illustrated in FIGS. 1A-1B is merely an example of how a portable computer and a docking base unit may be configured. As another example, instead of including a memory hub and I/O hub, each unit may be implemented with a separate system bridge chip (sometimes referred to as a south bridge) and a host bridge chip (sometimes referred to as a north bridge). Further, a bus architecture other than a PCI bus architecture may be used.

The docking connector 16 shown in FIGS. 1A–1B couples the host buses 106 (in the portable computer 12) and 152 (in the docking base unit 14). In alternative embodiments, the docking connector 16 or a second docking connector may also couple other buses in the system, including the system and secondary buses. Once the host buses are coupled, the system effectively becomes a multi-processing system that includes the CPU 100 and one or more CPUs 150. Some characteristics of each of the host buses 106 and 152 are that each is transaction oriented and supports glueless multiprocessing. An example of such a host bus is the Pentium® II front side bus. In the illustrated embodiment, the system is configurable as a tightly-coupled multiprocessing architecture, such as a symmetric/shared memory multiprocessing (SMP) architecture.

The portable computer 12 includes an operating system that is multiprocessor-compliant to allow multiprocessing capabilities once the portable computer 12 is docked to the docking base unit 14 to take advantage of the multiple CPUs 100 and 150. The portable computer 12 also includes system BIOS routines stored in the non-volatile memory 120 that controls initialization and setup of the computer system 10. Alternatively, the operating system and BIOS routines that are to be invoked once the portable computer 12 is docked to the docking base unit 14 may be initially stored in the docking base unit 14.

In one embodiment, the docking base unit 14 may include an I/O advanced programmable interrupt controller (APIC) 170, such as the 82093AA I/O APIC chip from Intel Corporation. The I/O APIC 170 provides multiprocessor interrupt management. The I/O APIC unit 170 is coupled to one or more local APIC units 151A–151C in the one or more CPUs 150A–150C over an APIC bus 172. When the portable computer 12 is docked to the docking base unit 14, the APIC bus 172 is also coupled through the connector 16 to a portable computer APIC bus 126 that is coupled to a local APIC unit 101 of the CPU 100 in the portable computer 12. Alternatively, the I/O APIC 170 may be located in the portable computer 12.

The I/O APIC unit 170 can receive interrupts from the I/O hub 162, which includes an interrupt controller coupled to interrupt lines from various devices in the system. The local APIC units (101, 151A–151C) in each of the CPUs 100 and 150A–150C work in conjunction with the I/O APIC unit 170 to handle interrupts in the system. Each CPU's local APIC unit determines whether or not its processor should accept interrupts that are broadcast on the APIC bus 172. In addition, the local APIC unit in each CPU provides inter-processor interrupts (IPIs) that are routed to other CPUs in the system 10.

In the multiprocessing system 10 according to an embodiment, one of the CPUs is designated as the master CPU (also referred to as the bootstrap CPU or processor) and the other CPUs are slave CPUs (also referred to as application CPUs or processors). Circuitry may be used to configure one of the CPUs as the master CPU. The circuitry may include pull-up or pull-down resistors tied to predefined input pins (such as pins 103A–103D) of the CPUs to select which one is the master CPU and which are the slave CPUs. Alternatively, the CPU input pins may be controlled by a device in the system 10, such as the memory or I/O hub in either the portable computer 12 or docking base unit 14. Alternatively, selection of the master/slave CPU may be controlled by a BIOS routine during system startup by programming memory or I/O-mapped control registers in the CPUs.

The master CPU is responsible for initializing the system and for booting the operating system. The slave CPUs are activated only after the operating system is up and running. In one embodiment, the CPU 100 in the portable computer 12 may be designated as the master CPU after docking to the docking base unit 14. Alternatively, any one of the CPUs 150A–150C may be designated as the master CPU.

Figure 2:
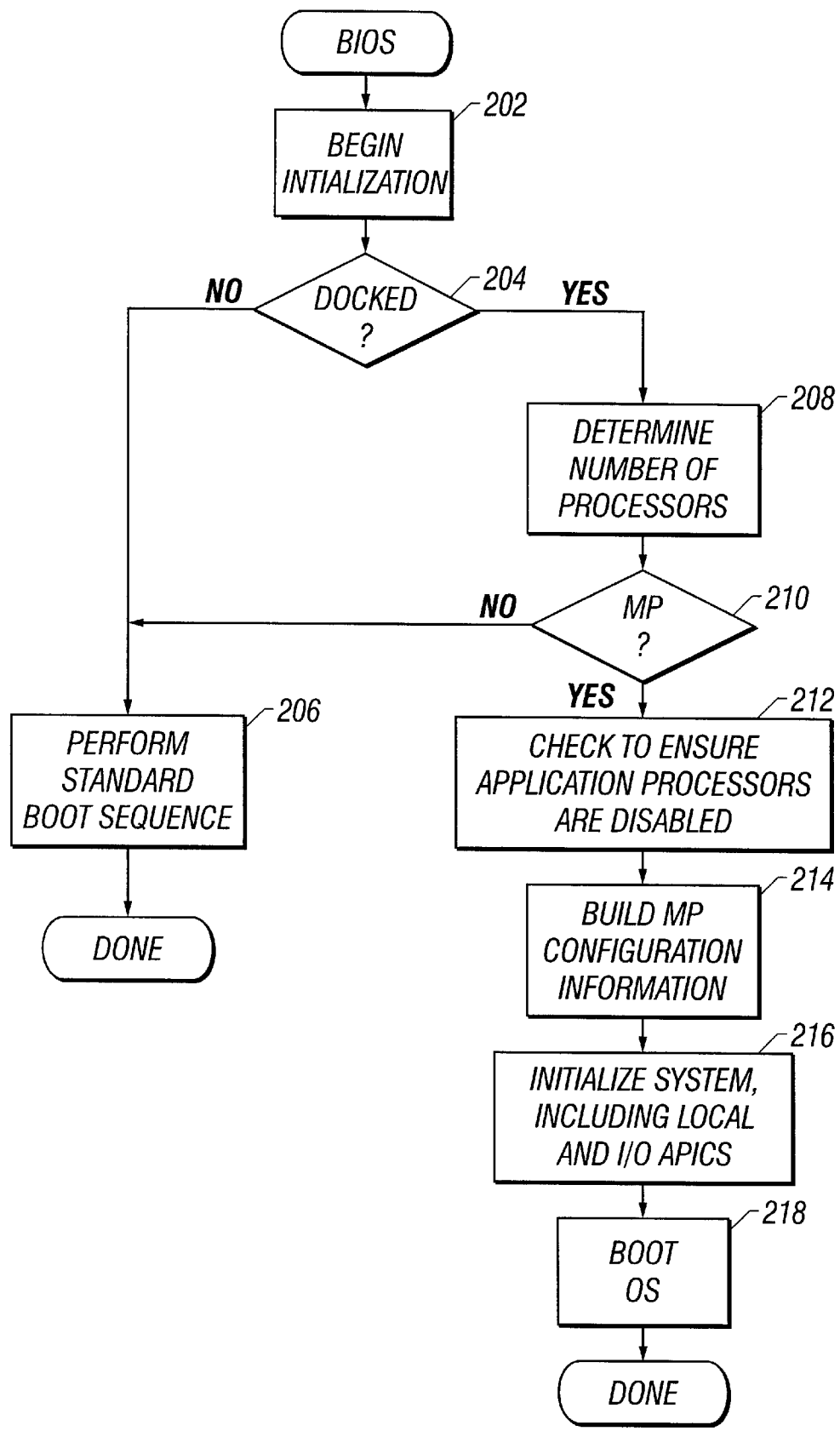
FIG. 2 is a block diagram of a basic input/output system routine according to an embodiment of the invention.

Referring to FIG. 2, system initialization as performed by a system BIOS routine according to one embodiment is illustrated. The BIOS sequence illustrated may be executed in the portable computer 12, or alternatively, in the docking base unit 14. Before the portable computer 12 is docked to the docking base unit 14, it may be placed into a powered-down mode. The portable computer 12 is turned back on after it is docked. Alternatively, one or more special pins in the docking connector 16 may notify the portable computer 12 of a pending dock event, which may cause generation of a system management interrupt to power the portable computer off. In another embodiment, the portable computer 12 may be automatically placed into a suitable low power mode (e.g., standby, hibernation) before docking in response to one or more signals indicating a pending dock event, provided appropriate electrical isolation of the host buses 106 and 152 is in place on either side of the connector 16. Once docked, a reset or power-up event is generated to initialize the system 10 including the portable computer 12 and docking base unit 14.

After the system reset sequence has put system hardware into an initial state, the master CPU 100 starts to execute instructions in the power-on self test (POST) procedure of the BIOS, which is responsible for initializing components in the system 10 to known states and for constructing system configuration information for the operating system to use. The BIOS routine first determines (at 204) if the portable computer system 12 has docked to a docking base unit 14. This can be determined, for example, by reading the value of a status register in the host bridge 104 or other suitable location that is set by a signal DOCK# from the connector 16 that is activated if the portable computer 12 is docked to the docking base unit 14. If the portable computer 12 is not docked, then the conventional uni-processor boot sequence is executed (at 206).

However, if the portable computer 12 is docked to the docking base unit 14, the BIOS determines (at 208) the number of processors that exist in the system 10. The BIOS may perform this by reading the APIC identification values stored in the local APIC unit of each CPU. The APIC identification (ID) value may be set by hardware at system reset. One of the CPUs is selected as the master CPU; in one embodiment, the CPU 100 in the portable computer system 12 is selected as the master CPU.

The BIOS next checks (at 210) whether there are more than one CPU in the system. If not, then the standard uni-processor boot sequence is executed (at 206). If the system is a multiprocessor system, the BIOS next checks (at 212) to ensure that the application CPUs are all disabled. The disabling may be controlled by hardware, such as by setting predefined input pins of the application processors to predetermined states. If the application processors (e.g., CPUs 150A–150C) are not disabled, the BIOS may place each application processor in a halted condition with interrupts disabled. This prevents the application processors from executing operating system code during initialization. However, each local APIC unit in an application processor is passively monitoring the APIC bus 152 and will react to certain inter-processor interrupts (IPIs), for example, the INIT or STARTUP IPI which may be used by the master CPU 100 to awaken application CPUs 150A–150C.

The BIOS next builds (at 214) configuration information (that may be stored in one or more configuration tables, for example) for use by the operating system, including a multiprocessor (MP) configuration table. The data structures that may be used by the BIOS according to one embodiment includes an MP floating pointer structure that contains a physical address pointer to the MP configuration table and other information. The MP configuration table contains configuration information about the local and I/O APICs, processors, buses, and system interrupts. In one embodiment, when present, the MP floating pointer structure may indicate that the system conforms to the Multiprocessor Specification, Version 1.4, published in May 1997.

After the configuration information has been set up, the BIOS next initializes (at 216) the system, including the local I/O APICs and other system components, by placing the components in known states. The BIOS may also set up routing tables in the memory hubs 104, 154 and I/O hubs 112, 162 of the system 10. These routing tables may include the memory and I/O address spaces of devices accessible by the memory or I/O hubs. For example, system memory 102 in the portable computer 12 may be disabled in favor of the larger memory 157 in the docking base unit 14. Other redundant components (either in the portable computer 12 or docking base unit 14) may also be disabled. During operation, the routing tables are used by the memory and I/O hubs to recognize transactions generated in the system's buses, including buses 106, 108, 114, 152, 156, and 166. Next, the operating system is booted up (at 218) by the master CPU 100 under control of the BIOS.

Figure 3:
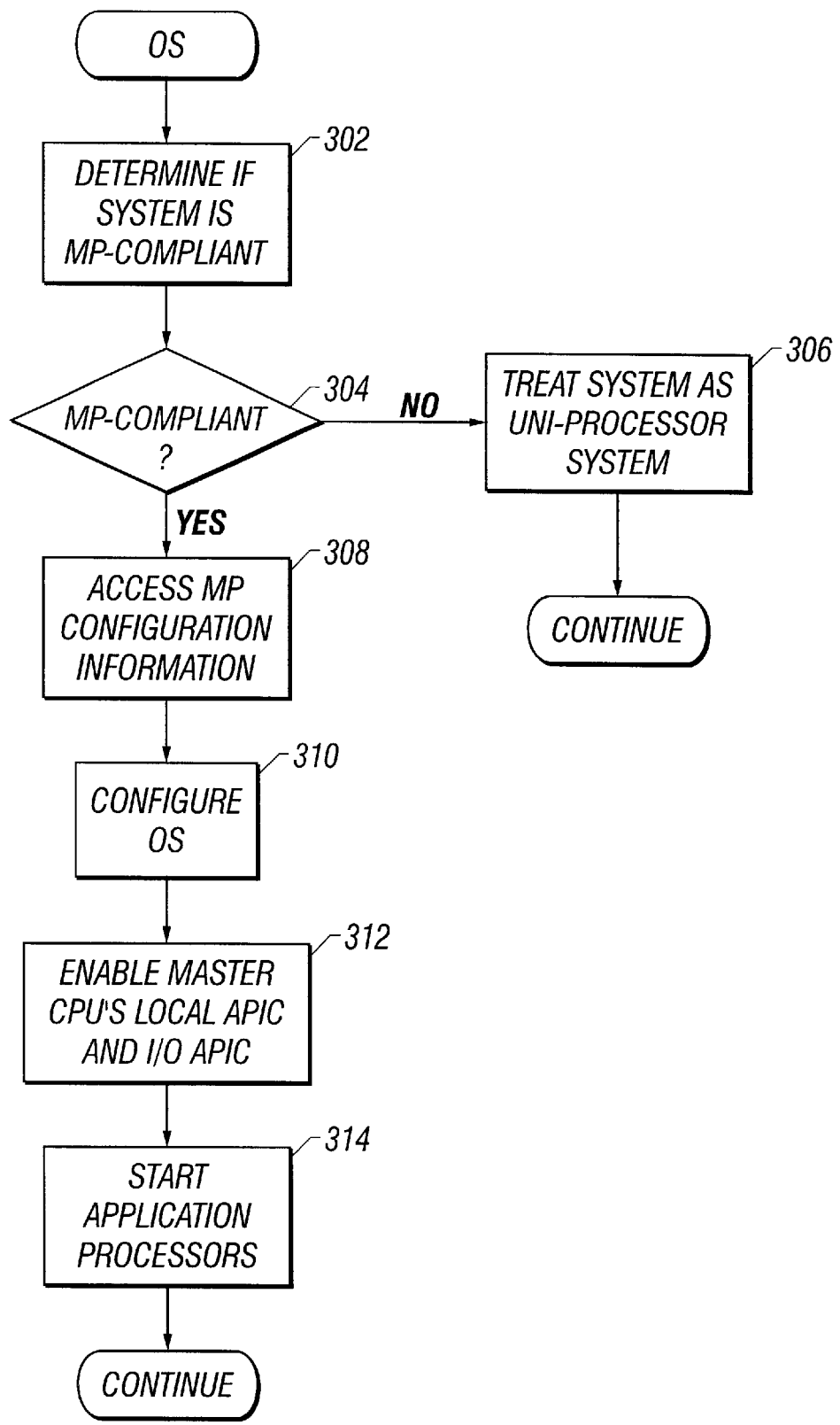
FIG. 3 is a flow diagram illustrating tasks of an operating system according to an embodiment of the invention.

Referring to FIG. 3, some of the initial tasks of the operating system are illustrated. First, the operating system determines (at 302) whether the system is multiprocessor-compliant. In one embodiment, the operating system checks to determine if the system 10 is multiprocessor-compliant by checking for the existence of the MP floating pointer structure. If the system is not multiprocessor-compliant (as determined at 304), the system is treated as a uni-processor system (at 306). However, if the system is multiprocessor-compliant, the operating system next accesses (at 308) the MP configuration table. Under control of the operating system, the master CPU 100 reads the processor entries in the configuration table to configure the operating system (at 310). The master CPU 100 also configures the operating system based on bus, I/O APIC, interrupts, and system interrupt assignment entries of the configuration table.

Next, the operating system enables (at 312) the master CPU's local APIC unit 101 as well as the I/O APIC unit 170. Enabling its local APIC unit allows the master CPU 100 to communicate with the other CPUs using IPI communications. At this time, all local APIC units of the application processors remain disabled or in their halted condition.

Next, the operating system causes the master CPU 100 to activate (at 314) the application processors. In one embodiment, the master CPU 100 sends a STARTUP IPI to each application processor. The identification information (IDs) of the local APIC units of the application processors are stored in the MP configuration table. These IDs may be used as the destination addresses in targeted IPIs. Once the application processors have started up, then the operating system is ready to perform multiprocessing operations.

In some embodiments, the performance levels of the CPU in the portable computer 12 may be different from the CPUs in the docking base unit 14. In one example, the docking base unit's CPUs may run at higher voltages and core clock frequencies than the CPU in the portable computer. In such a case, the MP configuration table may include a section to help the operating system configure itself to account for the variations in processor speeds. The MP configuration table may also account for different types of processors, operating speeds of the processors, latencies, and other different features.

Thus, a dockable computer system is described in which a portable computer may be docked to a docking base unit. Each of the portable computer and docking base unit includes at least one processor. Once docked, the buses on which the processors are located are coupled to enable multiprocessing operations.

Other embodiments are within the scope of the following claims. Although the illustrated embodiments of FIGS. 1–3 use a multiprocessor architecture that includes I/O and local APIC units, other multiprocessor architectures are contemplated. For example, a portable computer and docking base unit may be designed to implement a loosely coupled multiprocessing system. Although the BIOS and operating system are described as running in the portable computer, they may also be executed by a processor in the docking base unit. For example, the BIOS may be initially stored in the portable computer 12 or in the docking base unit 14 and executed by one of CPUs 150A–150C if one of them is designated as the master CPU. Further, other types of computing devices may be used with a docking base according to embodiments of the invention. For example, the computing devices may include hand-held electronic units, appliances, and so forth.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed:

1. A system comprising:
   a docking base unit;
   a portable computing device dockable to the docking base unit; and
   a module to identify the number of processors in the system in response to the portable computing device being docked to the docking base unit and to configure the system as a multiprocessor system in response to the number of processors identified.

2. The system of claim 1, wherein the module is invoked after the portable computing device is docked to the docking base unit.

3. The system of claim 1, wherein the module configures the system as a uni-processor system if the portable computing device is not docked to the docking base unit.

4. The system of claim 1, wherein the module configures the system as a uni-processor system if the identified number of processor is equal to one.

5. The system of claim 1, further comprising components, wherein the module selectively disables and enables the components in the system.

6. The system of claim 1, further comprising controllers and devices accessible by the controllers, wherein the module initializes routing tables in the controllers to set up the address spaces of devices recognizable by the controllers.

7. The system of claim 1, wherein a processor in the portable computing device and a processor in the docking base unit may have different operating levels, and wherein the module sets up configuration information to identify any differences between the processors.

8. The system of claim 1, wherein the module includes a basic input/output system routine.

9. The system of claim 1, wherein the module is started in response to a reset in the system.

10. The system of claim 1, wherein one of the processors in the portable computing device and docking base unit is identified as the master processor.

11. The system of claim 1, further comprising buses, wherein the processors in the portable computing device and docking base unit are coupled to corresponding buses, the system further comprising a docking connector to couple the buses once the portable computer is docked to the docking base unit.

12. The system of claim 1, wherein the module identifies the number of processors based on reading one or more advanced programmable interrupt controller identification values.

13. A portable device that is dockable to a docking base unit having a first processor, the portable device comprising:
   a second processor;
   a routine executed on one of the first and second processors once the portable device is docked to the docking base unit; and
   an operating system configured by the routine to be a multiprocessing operating system that is executable on the first and second processors once the portable device is docked to the docking base unit, wherein the routine determines the number of processors present in response to the portable device being docked to the docking base unit.

14. The portable device of claim 13, wherein the routine configures the operating system as a multiprocessing operating system if more than one processor is present.

15. The portable device of claim 13, wherein the routine configures the operating system as a uni-processing operating system if only one processor is present.

16. The system of claim 13, wherein the module determines the number of processors based on reading one or more advanced programmable interrupt controller identification values.

17. An article including a machine-readable storage medium containing instructions for causing a processor located in a system including a computing device dockable to a docking base to:
   detect whether the computing device is docked to a docking base unit;
   determine the number of processors in the computing device and docking base unit in response to the computing device being docked to the docking base unit, and configure the system as a multiprocessing system if more than one processor is detected.

18. The article of claim 17, wherein the storage medium contains instructions for causing the processor to configure the system as a uni-processor system if only one processor is detected.

19. The article of claim 17, wherein the storage medium contains a basic input/output system routine.

20. The article of claim 17, wherein the storage medium contains instructions for causing the processor to initialize routing tables in controllers in the system to set up address spaces of devices recognizable by the controllers.

21. A method of operating a system including a computing device that is dockable to a docking base, the method comprising:
    identifying the number of processors in the system in response to the computing device being docked to the docking base; and
    configuring the system as a multiprocessor system based on the number of processors identified.

22. The method of claim 21, further comprising configuring the system as a uni-processor system if the number of processors is equal to one.

23. An apparatus that is attachable to a unit having one or more slave processors, comprising:
    an operating system; and
    a master processor to:
        initialize the operating system in response to attaching the apparatus to the unit;
        execute a routine to verify that the one or more slave processors of the unit are not active; and
        activate the one or more slave processors of the unit in response to initializing the operating system.

24. The apparatus of claim 23, wherein the routine determines the number of processors in at least the unit.

25. The apparatus of claim 24, wherein the routine determines the number of processors in the apparatus.

26. The apparatus of claim 24, wherein the routine disables the one or more slave processors of the unit.

27. The apparatus of claim 24, wherein the routine determines the number of processors based on reading one or more advanced programmable interrupt controller identification values.

* * * * *